United States Patent
Yavo et al.

(10) Patent No.: US 11,909,761 B2
(45) Date of Patent: *Feb. 20, 2024

(54) MITIGATING MALWARE IMPACT BY UTILIZING SANDBOX INSIGHTS

(71) Applicant: Fortinet, Inc., Sunnyvale, CA (US)

(72) Inventors: Udi Yavo, Herzlia (IL); Roy Katmor, San Francisco, CA (US); Ido Kelson, Tel-Aviv (IL)

(73) Assignee: Fortinet, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/591,409

(22) Filed: Feb. 2, 2022

(65) Prior Publication Data

US 2022/0159014 A1     May 19, 2022

Related U.S. Application Data

(63) Continuation of application No. 16/709,379, filed on Dec. 10, 2019, now Pat. No. 11,277,438.

(51) Int. Cl.
*H04L 9/40* (2022.01)
*G06F 21/53* (2013.01)
*G06F 21/55* (2013.01)
*G06F 21/56* (2013.01)

(52) U.S. Cl.
CPC .......... *H04L 63/145* (2013.01); *G06F 21/53* (2013.01); *G06F 21/566* (2013.01); *G06F 21/568* (2013.01); *H04L 63/02* (2013.01); *G06F 21/55* (2013.01); *H04L 63/1441* (2013.01)

(58) Field of Classification Search
CPC .......... G06F 21/56; G06F 21/53; G06F 21/55; G06F 21/566; G06F 21/568; H04L 63/145; H04L 63/1441; H04L 63/02; H04L 9/40
See application file for complete search history.

(56) References Cited

U.S. PATENT DOCUMENTS 10,102,374 B1 * 10/2018 Cohen .................. G06F 21/554
11,275,834 B1 *  3/2022 Offer .................... H04L 63/145
(Continued)

FOREIGN PATENT DOCUMENTS

CA      2862596 A1 *  6/2013 .......... G06F 11/1448

*Primary Examiner* — Jayesh M Jhaveri
(74) *Attorney, Agent, or Firm* — Jaffery Watson Mendonsa & Hamilton LLP (57) ABSTRACT

Systems and methods for mitigating the impact of malware by reversing malware related modifications in a computing device are provided. According to an embodiment, a sandbox service running within a network security platform protecting an enterprise network receives a file containing malware and associated contextual information from an endpoint security solution running on an endpoint device, which has been infected by the malware. The sandbox service captures information regarding a first series of actions performed by the malware and based on the first series of actions generates a remediation script specifying a second series of actions that are configured to restore the endpoint device to a pre-infected state. The network security platform causes the endpoint device to be returned to the pre-infected state by causing the endpoint security solution to execute the remediation script on the endpoint device.

25 Claims, 6 Drawing Sheets

(56) References Cited

U.S. PATENT DOCUMENTS

| | | | |
|---|---|---|---|
| 2010/0005531 A1* | 1/2010 | Largman | G06F 21/53 |
| | | | 726/24 |
| 2019/0235973 A1* | 8/2019 | Brewer | G06F 11/1469 |
| 2020/0050762 A1* | 2/2020 | Sathyanarayana | G06F 21/566 |
| 2020/0143054 A1* | 5/2020 | Cohen | G06F 21/554 |
| 2021/0026947 A1* | 1/2021 | Korotaev | G06F 21/577 |

* cited by examiner

MITIGATING MALWARE IMPACT BY UTILIZING SANDBOX INSIGHTS

CROSS REFERENCE TO RELATED APPLICATIONS

This application is a continuation of U.S. patent application Ser. No. 16/709,379 entitled "Mitigating Malware Impact by Utilizing Sandbox Insights" and filed by Yavo et al. on Dec. 10, 2019. The entirety of the aforementioned application is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2019, Fortinet, Inc.

BACKGROUND

Field

Embodiments of the present invention generally relate to network security and network defense systems. In particular, embodiments of the present invention relate to an improved approach that utilizes sandbox insights to mitigate impact of malicious software ("malware") by reversing malware-related modifications in a computing device.

Description of the Related Art

In networking architectures, malware is the most common external threat that causes widespread damage and disruptions in computing resources of an organization. They are different from normal programs in a way that most of them have an ability to spread in the network, remain undetectable and persistently cause damage to infected computing devices. Malware generally executes with a harmful intent, for example, to destroy data, run destructive or intrusive programs, or otherwise compromise confidentiality of data and normal working of applications, or operating system.

Modern security services provide intelligent malware protection by, among other things, scanning and evaluating network traffic from a variety of computing devices to identify and block potential malware. However, it becomes difficult to capture malware once it has evaded the security services or otherwise managed to execute one or more times. Furthermore, remediation of malware actions on an infected computing device represents a challenging problem. Once malware has managed to execute, the mere removal of files associated with the malware may not remediate the infected computing device. For example, consider the situation in which malware has added a new user in a computing device, the computing device would remain compromised even if all of the files associated with the malware are completely removed as the added user account may be used as an access mechanism to continue to harm the infected computing device or the network at large.

Therefore, in view of the foregoing, there is a need in the art for improved techniques that securely remediate harmful effects of actions performed by malware on a computing device.

SUMMARY

Systems and methods are described for mitigating the impact of malware by reversing malware related modifications in a computing device. According to an embodiment, a sandbox service running within a network security platform protecting an enterprise network receives a file containing malware and associated contextual information from an endpoint security solution running on an endpoint device, which has been infected by the malware. The sandbox service captures information regarding a first series of actions performed by the malware and based on the first series of actions generates a remediation script specifying a second series of actions that are configured to restore the endpoint device to a pre-infected state. The network security platform causes the endpoint device to be returned to the pre-infected state by causing the endpoint security solution to execute the remediation script on the endpoint device.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described to mitigate impact of a malware by reversing malware related modifications in a computing device. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrases "endpoint protection platform" or "endpoint security solution" generally refer to cybersecurity monitoring and/or protection functionality implemented on an endpoint device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and may leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the Software as a Service (SaaS) enSilo Endpoint Security Platform and the FORTICLIENT integrated endpoint protection platform available from Fortinet, Inc. of Sunnyvale, CA.

The term "event" generally refers to an action or behavior of a process running on an endpoint device. Non-limiting examples of events include filesystem events and operating system events. Events that may be initially classified as suspicious or malicious by a heuristic engine and/or a machine-learning engine employed by the endpoint protection platform, for example, may include an attempt to communication with a critical software vulnerability (CVE), an attempt to access the registry of the operating system, the network or the file system, an attempt by the process to copy itself into another process or program (in other words, a classic computer virus), an attempt to write directly to the disk of the endpoint device, an attempt remain resident in memory after the process has finished executing, an attempt to decrypt itself when run (a method often used by malware to avoid signature scanners), an attempt to binds to a TCP/IP port and listen for instructions over a network connection (this is pretty much what a bot—also sometimes called drones or zombies—do), an attempt to manipulate (copy, delete, modify, rename, replace and so forth) files that are associated with the operating system, an attempt to read the memory of sensitive programs, an attempt to hook keyboard or mouse (a/k/a keylogging), an attempt capture a screen shot, an attempt to record sounds, and/or other behaviors or actions that may be similar to processes or programs known to be malicious. In one embodiment, events may be detected or intercepted by the endpoint protection platform hooking filesystem and/or operating system application programming interface (API) calls of interest and/or by leveraging a hypervisor to monitor the operating system.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTI-WEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrases "network security device" or "security device" generally refer to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, anti-spam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like. According to one embodiment, a management appliance associated with an enterprise network that manages the network security devices associated with the enterprise network incorporates the SDWAN controller functionality described herein and the network security devices operate as edge devices and/or hub devices in accordance with roles assigned to them by the management appliance.

The phrase "security event classification source" generally refers to a security service in the form of hardware, software or a combination thereof that is capable of contributing in whole or in part to a classification result for a given security event (e.g., as malicious, suspicious, a potentially unwanted program (PUP), inconclusive, likely safe or safe). Non-limiting examples of security event classification sources include various types of endpoint protection platforms/solutions, antivirus engines, static malware analysis engines, dynamic malware analysis engines, memory forensic engines, sandboxes, User and Entity Behavior Analytics (UEBA), Intrusion Detection Systems (IDSs), content inspection engines, distributed denial of service (DDoS) mitigation engines, machine-learning classifiers, file threat-feeds, Internet Protocol (IP)/uniform resource locator (URL) threat feeds, Indicators of compromise (IOC) threat feeds, file reputation services, IP/URL reputation services, vulnerability discovery services, Tactics Techniques and Procedures (TTPs) feeds, security events collected from another private network, EDR data, and the like. In one embodiment, some security event classification sources may be limited to classifying one or more specific artifacts of a given security event, while others may be capable of independently classifying a given security event and producing a classification result. For example, a hash feed that generates a hash of a file associated with an event may be capable of classifying the file and an IP or URL feed (e.g., an IP/URL threat feed or an IP/URL reputation service) may be capable of classifying an IP address or a URL associated with an event.

The phrase "network security platform" generally refers to one or more security event classification sources that are used to protect a private network. The security event classification sources of a network security platform may have knowledge of each, communicate with each other, cooperate with each other to facilitate classification of observed security events and otherwise create synergies and improve the overall protection provided to the private network against cybersecurity threats. Alternatively or additionally, the security event classification sources participating within a network security platform may be under common control of a management service or device. A network security platform may include security event classification sources from the same or different parties (e.g., manufacturers and/or service providers) and the participating security event classification sources may reside or operate within different computing environments. For example, some of the participating security event classification sources may be implemented in physical form as part of an on premises solution and others may be implemented as services or in virtual form within a cloud-based environment (e.g., a cloud-base security service (e.g., the enSilo Cloud Service or FORTIGUARD security services available from the assignee of the present invention) or within a third-party cloud provider). Non-limiting examples of a network security platform include one or more network security devices and/or endpoint protection platforms that are part of a cooperative security fabric (e.g., the Fortinet Security Fabric) and one or more network security services implemented within a cloud-based security service or other public, private or hybrid cloud environment. While in the context of various examples described herein, for sake of simplicity and brevity, a network security platform is described as including an endpoint protection platform running on an endpoint device of a private network and a sandbox service, those skilled in the art will appreciate embodiments of the present invention are applicable to network security platforms including more and/or different security event classification sources.

The term "remediation" generally refers to addressing changes made to a computer system as a result of malicious activity. For example, remediation may involve removing threats form an infected system and reversing system changes made by a malicious process. The remediation may be performed automatically or manually or a combination thereof. Remediation may involve installation of an update, a patch or a bug fix to address a vulnerability exploited by the malicious process and/or removing a "backdoor" (e.g., in the form of a new user account) created by the malicious process. Remediation may also involve removal of malicious files, termination of malicious processes, deletion and/or modification of registry keys in order to restore the system to its pre-infected stated. In one embodiment, remediation also involves providing a single alert to the end user or administrator notifying that the malware has been stopped and allowing security teams to conduct forensics and threat hunting on their own time. According to one embodiment, endpoint remediation may be facilitated by providing the endpoint protection platform with information regarding a Representational State Transfer (REST) API through which one or more remediation tools are accessible.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments. Numerous modifications, changes, variations, substitutions, and equivalents will be apparent to those skilled in the art, without departing from the spirit and scope of the invention, as described in the claims.

According to various embodiments of the present invention, a sandbox service running within a network security service protecting an enterprise network, including a variety of endpoint devices, receives a file containing malware from an endpoint security solution running on an endpoint device, which has been infected by a malware. In response to receipt of the file, the sandbox service captures information regarding a first series of actions performed by the malware, where each action of the series of actions may be associated with a time stamp. Based on the first series of actions, the sandbox service generates a remediation script specifying a second series of actions that are configured to restore the endpoint device to its pre-infected state representing a state of the endpoint device prior to being infected by the malware. Finally, the network security service causes the endpoint device to be returned to the pre-infected state by causing the endpoint security solution to execute the remediation script on the endpoint device.

Various embodiments of the present invention utilize insights of a sandbox service (e.g., a sandbox service implemented in a cloud-based security service or a sandbox appliance residing within the same private network as an endpoint device) to reverse certain types of persistent malware related modifications made to the endpoint device by using output of malware execution and effectively executing the output in reverse order so as to restore the endpoint device to its pre-infected state. In order to for the sandbox service to more closely emulate the circumstances and environment in which the event observed by the endpoint protection platform was triggered on the endpoint device, in one embodiment, a fulsome set of contextual information is captured by the endpoint protection platform and communicated to the sandbox service. In this manner, insights captured by the sandbox service resulting from detonation of the threat and subsequent behaviors/actions associated with the threat are more likely to match those performed on the endpoint device. In one embodiment, the contextual information includes one or more of command line information (e.g., command line instruction(s) and associated parameters) associated with the execution of the process, a process execution chain, a memory dump associated with the process, information indicative of an application with which the process is associated, information identifying the user, computer name, domain name, geographical location (based on IP), operating system type, file name used for execution, related dll files, environment variables associated with the process and the like. In an example, the sandbox service may detect that the threat at issue, among other things, attempts to add a new user and thus may record this as one of the insights to be used to remediate the endpoint device. In one embodiment, the sandbox service uses the recorded output, representing observed behaviors and actions attempted by the threat, to generates a remediation script, that can be executed on the endpoint device by the endpoint protection platform, for example, to restore the endpoint device to its pre-infection state (e.g., by removing the new user).

Figure 1A:
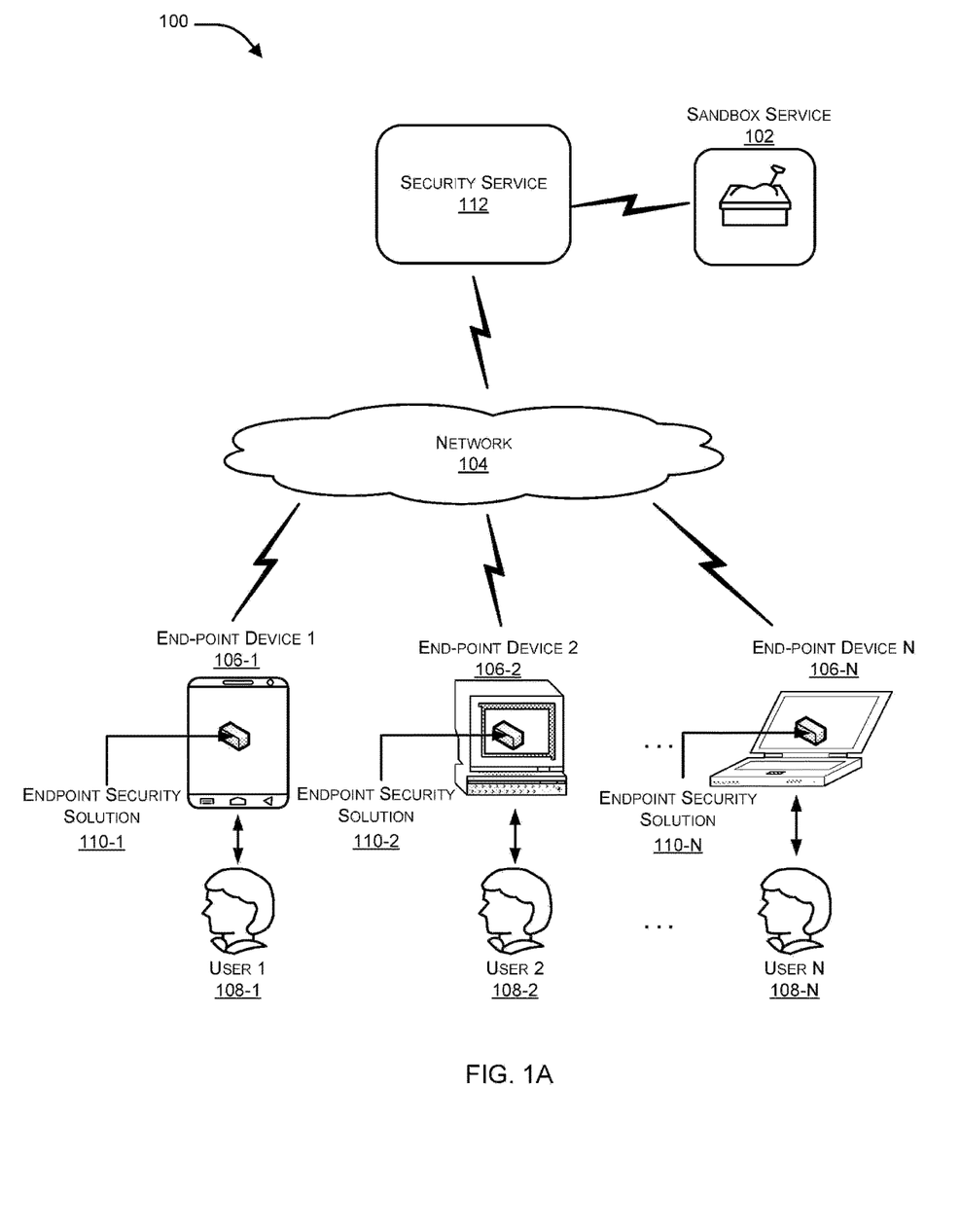
FIGS. 1A-B illustrate network architectures in which aspects of the present invention can be implemented in accordance with an embodiment of the present invention.
Figure 1B:
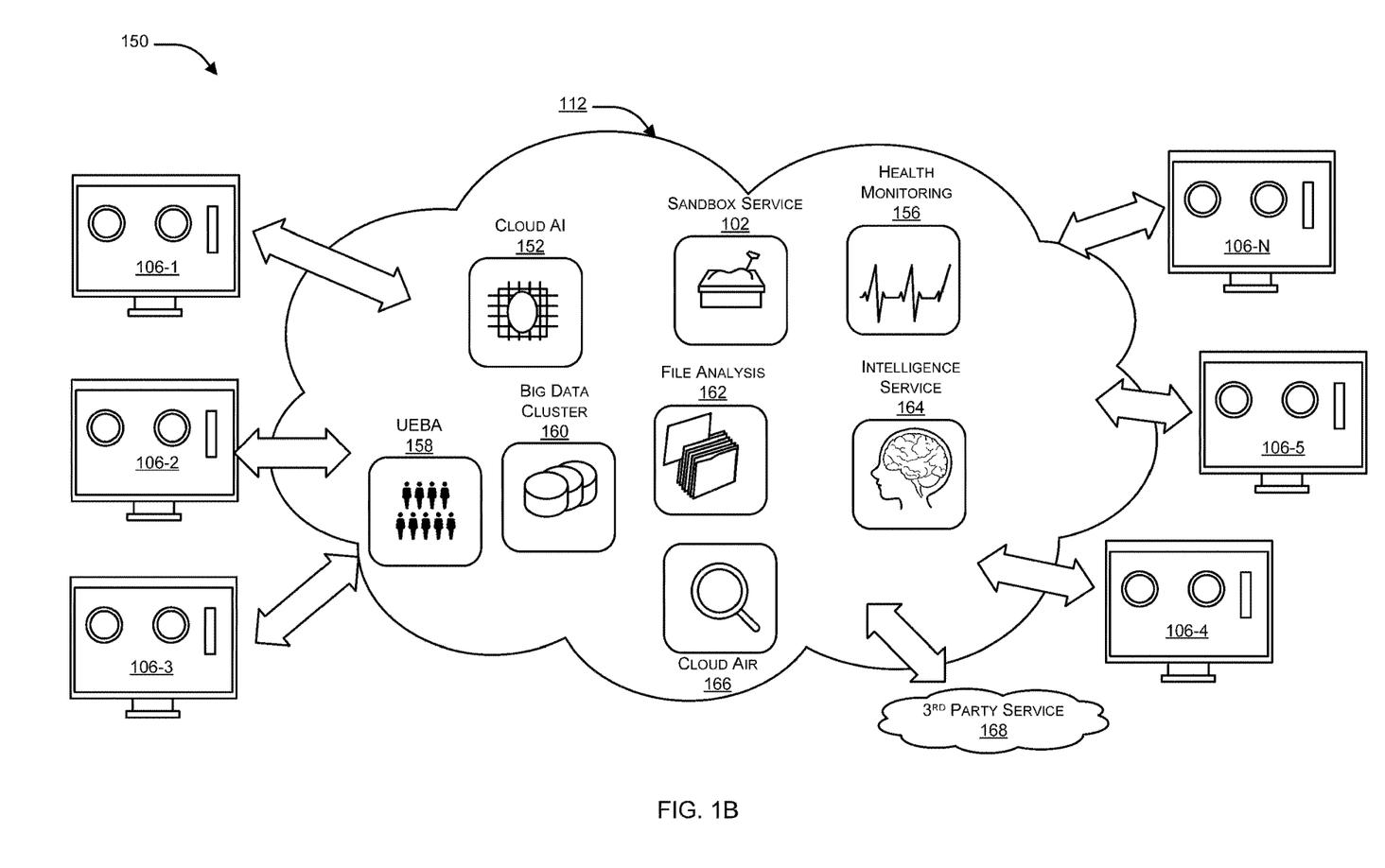

FIGS. 1A-B illustrate network architectures 100 and 150 in which aspects of the present invention can be implemented in accordance with an embodiment of the present invention. Referring to architectures 100 and 150, a cloud-based network security service 112 that implements a sandbox service 102, protects an enterprise network 104 including multiple endpoint devices 106-1, 106-2 . . . 106-N (which may be collectively referred to herein as endpoint devices 106 and which may be individually referred to herein as an endpoint device 106). Users 108-1, 108-2 . . . 108-N (may be collectively referred to as users 108 and individually as a user 108, hereinafter) of network 104 can interact with endpoint devices 106, which may include, but are not limited to, personal computers, smart devices, web-enabled devices, hand-held devices, laptops, mobile devices (e.g., smartphones), and the like.

Those skilled in the art will appreciate that, network 104 in architecture 100 can be a wireless network, a wired network or a combination thereof that can be implemented as one of the different types of networks, such as an Intranet, a Local Area Network (LAN), a Wide Area Network (WAN), Internet, and the like. Further, the network can either be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

In addition to sandbox service 102, security service 112 may include one or more other functional components, including, for example, cloud based Artificial Intelligence (AI) 152, a User and Entity Behavior Analytics (UEBA) service 158, big cluster 160, a file analysis service 162, a cloud-based Automated Incidence Response and Remediation (AIR) service, a health monitoring service 156, and an intelligence service 164. The functional components of security service 112 along with third-party services 168 may facilitate proactive, real-time and fully automated security with endpoint devices 106 through a single integrated platform.

According to an embodiment, endpoint security solutions 110-1, 110-2, . . . , 110-N (which may be collectively referred to as endpoint security solutions 110 and may be individually referred to as an endpoint security solution 110, hereinafter) running on corresponding endpoint devices 106 perform endpoint security analysis to detect whether endpoint device 106 has been potentially been infected by malware. In one embodiment, the endpoint security solution 110 may determine the endpoint device 106 has potentially been infected with malware as a result of observing an event associated with a process running on the endpoint device 106 that is initially classified by the endpoint security solution 110 as suspicious, malicious, or a PUP.

Responsive to determining that endpoint device 106 has potentially been infected by malware, endpoint security solution 110 may transmit a file containing the suspected malware from endpoint device 106 to security service 112 running sandbox service 102 along with contextual information captured by the endpoint security solution 110. In one implementation, security service 112 may be a cloud-based network security service running sandbox service 102, which can be implemented as a physical or virtual sandbox appliance. In alternative embodiments, the sandbox service 102 may be provided by a sandbox appliance residing in the enterprise network in the form of on-premises equipment.

According to an embodiment, sandbox service 102 receives the file containing the malware from endpoint security solution 110 running on endpoint device 106, which has been infected by the malware, and a corresponding set of contextual information. Sandbox service 102 captures information regarding a first series of actions performed by the malware by executing the file at issue based on the supplied contextual information. Each action of the first series of actions may be associated with a time stamp, so that sandbox service 102 may represent each action graphically on a time-line. For example, a three-dimensional in-memory graph may be used to represent the first series of actions in an operating system. Those skilled in the art will appreciate that malware may cause a change in a registry file, a change in a system file and/or a change in network behavior of endpoint device 106. As such, the first series of actions may pertain to at least one of such changes.

In one embodiment, sandbox service 102 may capture the information regarding the first series of actions by tracing operating system code of endpoint device 106 using static or dynamic analysis. In the context of performing a static analysis, sandbox service 102 may reverse engineer dead malicious code to understand the working of the malware and prepare its remediation. In the context of a dynamic analysis, sandbox service 102 may run the malware in an isolated environment so as to identify its behavior.

Sandbox service 102 generates a remediation script specifying a second series of actions based on the first series of actions. Those skilled in the art will appreciate that the second series of actions are intended to reverse the actions of the first series of actions and are configured to restore endpoint device 106 to its pre-infected state (i.e., the state of endpoint device 106 prior to being infected by the malware). According to an implementation, sandbox service 102 records persistent actions that the malware takes in-order to reverse the effect of the actions. To mitigate the impact of the actions taken by the malware each type of action is associated with an undo recipe, which may be executed by a kernel driver.

Certain non-limiting examples of undo recipes and reverse actions associated with the actions are discussed herein. For example, if malware adds a user, the reverse action would be to remove the user. In a scenario in which the specific name of the user was not ascertainable by the sandbox service 102, for example as a result of randomization employed by the malware, the undo recipe would involve the use of an Event Data Recorder (EDR) to identify a recently created user and remove the same. Time based removal can also be performed by checking time-stamp of an activity when the user was added. In another example, if the malware drops a file on disk, the reverse action would be to remove the file. In a scenario in which the specific file name was not ascertainable by the sandbox service 102, the undo recipe would use data of the EDR to find the most recently created file and/or attempt a hash-based matching and remove the file. Alternately, the undo recipe may use file system records such as New Technology File System (NTFS) Master File Table (MFT) data to detect the file. Additionally, sometimes the undo recipe may infer the name from other actions, such as persistency. In yet another example, if the malware adds or modifies a registry key for persistency, the reverse action removes malware persistence based on the registry key. As an example, if "HKEY_CURRENT_USER\Software\Microsoft\Windows\CurrentVersion\Run" is used as a persistence mechanism, the relevant key would be removed. In another example, if the malware alters one or more firewall rules, the reverse action would reverse the alterations. For example, if the malware opened a particular port, the reverse action would be to close the particular port. In another example, if the malware injected a benign process, the reverse action would be to terminate the process. For example, if the process is a random scan of in-memory signatures, the reverse action would kill the relevant processes. In another example, if the malware redirects a connection by modifying a hosts file, the reverse action would remove the specific record from the hosts file. If data does not match, the undo recipe may check the modification time to determine if it was indeed changed and in that case remove suspicious records based on a target. In another example, if the malware loads a driver, the reverse action would attempt to delete the driver and reboot the endpoint device 106. In another example, if the malware modifies or adds an environment variable, the reverse action would be to remove or restore the modified environmental variable to a previous value, which may be based on EDR data.

Once the remediation script is determined, security service 112 causes the endpoint device 106 to be returned to its pre-infected state by causing endpoint security solution 110 to execute the remediation script on the endpoint device. In this manner, the utilization of sandbox insights facilitates mitigation of the impact of the malware on the endpoint device 106.

Figure 2:
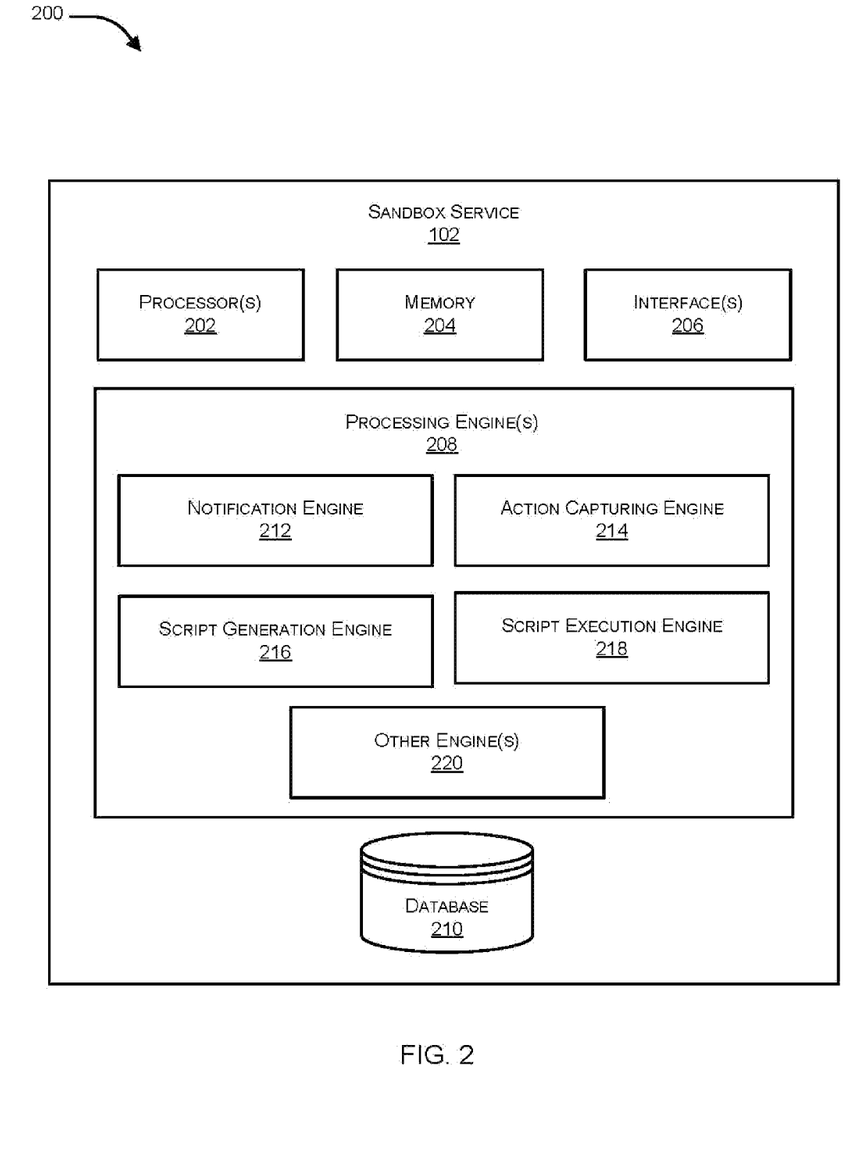
FIG. 2 is a block diagram illustrating functional components of a sandbox service in accordance with an embodiment of the present invention.

FIG. 2 is a block diagram 200 illustrating functional components of a sandbox service 102 in accordance with an embodiment of the present invention. In the context of the present example, sandbox service 102 can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of sandbox service 102. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Sandbox service 102 can also include one or more Interface(s) 206. Interface(s) 206 may include a variety of interfaces, for example, interfaces for data input and output devices, referred to as I/O devices, storage devices, and the like. Interface(s) 206 may facilitate communication of sandbox service 102 with various devices coupled to sandbox service 102. Interface(s) 206 may also provide a communication pathway for one or more components of sandbox service 102. Examples of such components include, but are not limited to, processing engine(s) 208 and database 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) 208 may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, sandbox service 102 can include the machine-readable storage medium storing the instructions and the processing resource to execute the instructions, or the machine-readable storage medium may be separate but accessible to sandbox service 102 and the processing resource. In other examples, processing engine(s) 208 may be implemented by electronic circuitry. Database 210 can include data that is either stored or generated as a result of functionalities implemented by any of the components of processing engine(s) 208.

In an example, processing engine(s) 208 can include a notification engine 212, an action capturing engine 214, a script generation engine 216, a script execution engine 218 and other engine(s) 220. Other engine(s) 220 can implement functionalities that supplement applications or functions performed by sandbox service 102 or processing engine(s) 208.

According to an embodiment, notification engine 212 receives a file containing malware from an endpoint security solution running on an endpoint device, which has been infected by the malware, and associated contextual information. In response to receipt of the file and the associated contextual information, action capturing engine 214 captures information regarding a first series of actions performed by the malware. Non-limiting examples of the actions for which information may be captured include changes to a registry file, changes to a system file, changes to network behavior of the endpoint device, changes to a filesystem (e.g., creation of or changes to a file), creation of a new user account, changes to firewall rules or other security rules, injection of code into another process, loading of a driver, and creation or modification of environment variables. In one embodiment, the actions may be identified based on one or both of static and dynamic analysis by action capturing engine 214.

According to an embodiment, based on the first series of actions, script generation engine 216, generates a remediation script specifying a second series of actions that are configured to restore the endpoint device to its pre-infected state representing a state of the endpoint device prior to being infected by the malware at issue. Each action of the second series of actions may be based on a reverse action corresponding to the first series of actions and can be identified based on a mapping, such as an undo recipe.

According to an embodiment, once the remediation script is generated, a script execution engine 218 causes the endpoint device to be returned to the pre-infected state by causing the endpoint security solution to execute the remediation script on the endpoint device.

Figure 3:
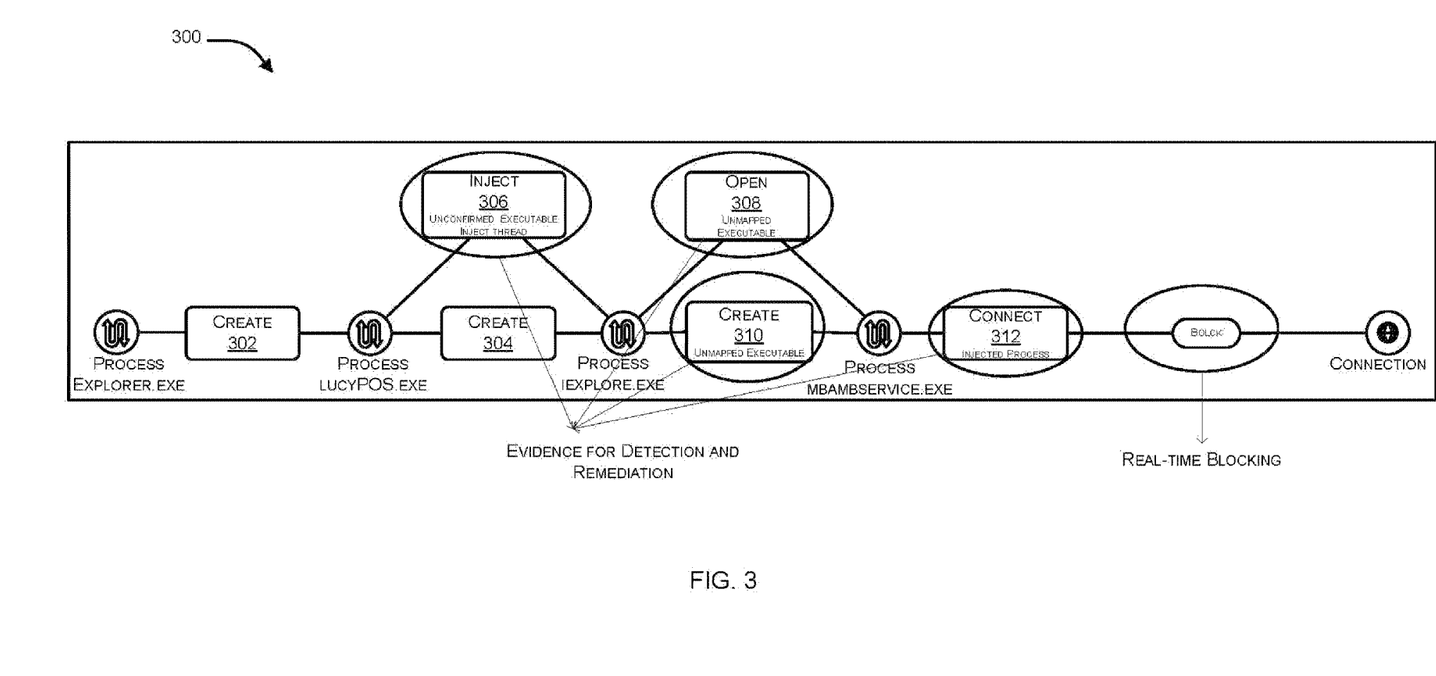
FIG. 3 is an example of time series events performed in a computing device in accordance with an embodiment of the present invention.

FIG. 3 is an example of a time series of events 300 observed in a computing device in accordance with an embodiment of the present invention. In the context of the present example, a computing device may be infected by malware (e.g., "lucyPOS.exe" and "mbambservice.exe"). The time series of events 300 performed in the computing device are examples of the first series of actions 306, 308, 310 and 312 for which information can be captured by a sandbox service as evidence for detection and remediation of the impact of the malware. For example, in one embodiment, the sandbox service may determine corresponding remedial actions for actions 306, 308, 310 and 312 based on undo recipes associated with outcomes of execution of the malware in order to return the computing device to its pre-infected state.

Figure 4:
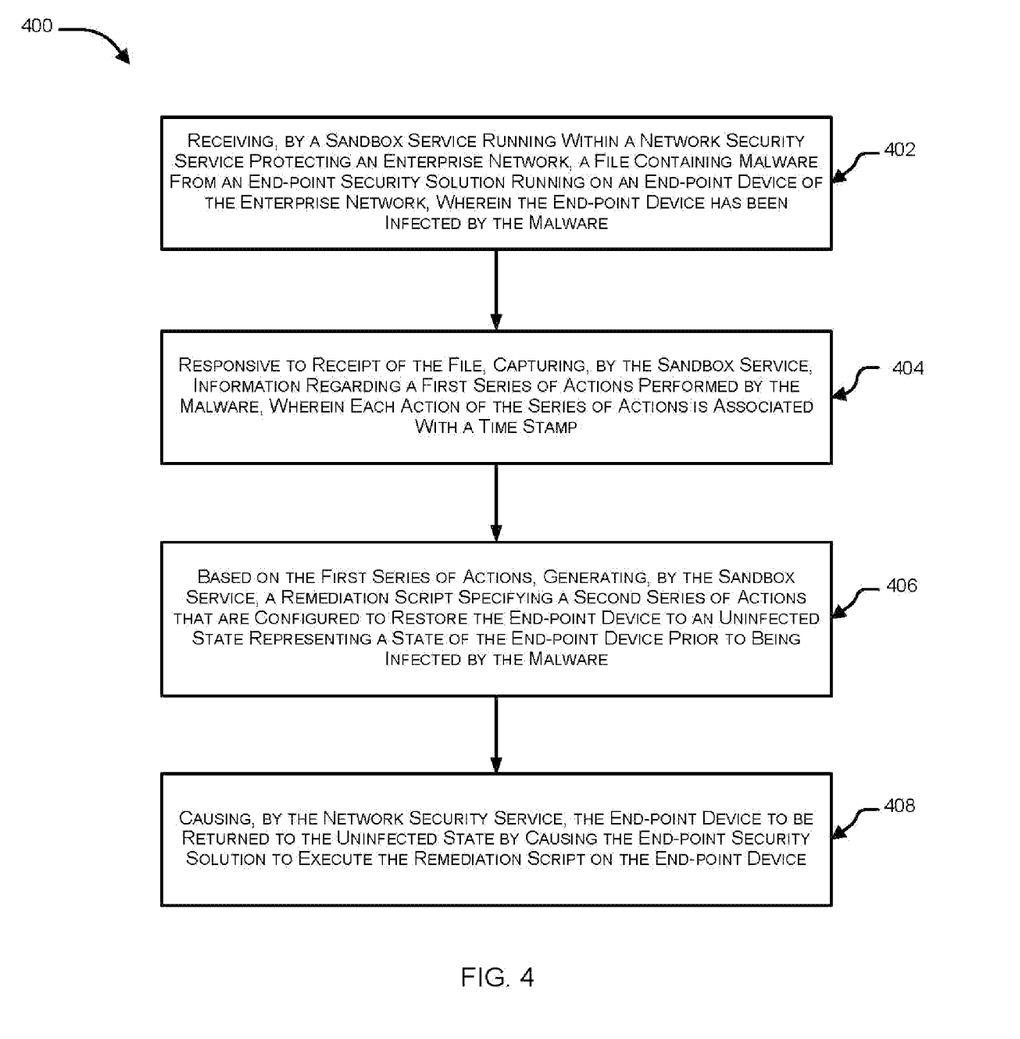
FIG. 4 is a flow diagram illustrating a process performed by a sandbox service in accordance with an embodiment of the present invention.

FIG. 4 is a flow diagram 400 illustrating a process performed by a sandbox service in accordance with an embodiment of the present invention. The processing described with reference to FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by a combination of one or more computer systems in physical or virtual form, such as computer system 500 described with reference to FIG. 5.

At block 402, a sandbox service (e.g. a physical or virtual sandbox appliance or a docker container) associated with a network security platform protecting an enterprise network, receives a file containing malware and associated contextual information from an endpoint security solution running on an endpoint device of the enterprise network, where the endpoint device has been infected by the malware.

In response to receipt of the file, at block 404, the sandbox service captures information regarding a first series of actions performed by the malware. In one embodiment, a timestamp may also be captured for each action of the first series of actions.

Based on the first series of actions, at block 406, the sandbox service generates a remediation script specifying a second series of actions that are configured to restore the endpoint device to a pre-infected state representing a state of the endpoint device prior to being infected by the malware.

Finally, at block 408, the network security platform (or the sandbox security service) causes the endpoint device to be returned to the pre-infected state by causing the endpoint security solution to execute the remediation script on the endpoint device.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 5:
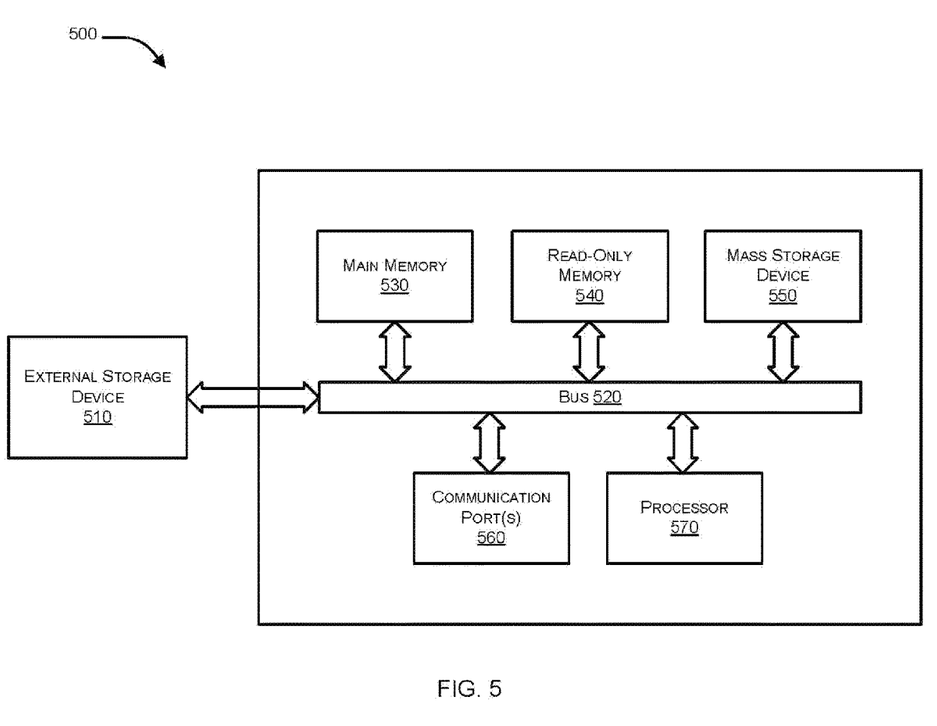
FIG. 5 illustrates an exemplary computer system in which or with which embodiments of the present invention may be utilized.

FIG. 5 illustrates an exemplary computer system 500 in which or with which embodiments of the present invention may be utilized. For example, computer system 500 may represent an endpoint device (e.g., endpoint device 106), a server within a cloud-based security service (e.g., security service 112) or a subset of computing resources associated with a sandbox service (e.g., sandbox service 102) or a network security appliance of a network security platform protecting a private network. While various examples described herein are described with reference to physical computer systems, those skilled in the art will appreciate the functionality and methodologies described herein are equally applicable to computing environments (e.g., a data center or cloud) in which functionality is deployed on virtual machines or as a service in the context of a container, a pod, or other virtualized environment. Furthermore, while in some embodiments, the various security event classification sources discussed herein have been described with reference to various security event classification services, it is to be appreciated that one or more of the various security event classification sources may be network security devices represented in virtual or physical form.

As shown in FIG. 5, computer system 500, includes an external storage device 510, a bus 520, a main memory 530, a read only memory 540, a mass storage device 550, a communication port 560, and a processor 570.

Those skilled in the art will appreciate that computer system 500 may include more than one processor 570 and communication ports 560. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention.

Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g. start-up or BIOS instructions for processor 570.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer system. Other operator and administrative interfaces can be provided through network connections connected through communication port 560. External storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   receiving, by a processing resource associated with a sandbox service, a file containing malware via a communication network from an endpoint device and contextual information associated with the file, wherein the endpoint device has been infected by the malware;
   capturing, by the processing resource, information regarding a first series of actions performed by the malware, wherein the capturing is done based at least in part upon receiving the file and the contextual information;
   generating, by the processing resource, a remediation script specifying a second series of actions that are configured to restore the endpoint device to a pre-infected state representing a state of the endpoint device prior to being infected by the malware, wherein the generating is based at least in part on the first series of actions;
   transferring, by the processing resource, the remediation script to an endpoint agent executing on the endpoint device via the communication network; and causing the endpoint device to execute the remediation script.

2. The method of claim 1, wherein executing the remediation script returns the endpoint device to the pre-infected state.

3. The method of claim 1, wherein each action of the first series of actions is associated with a time stamp.

4. The method of claim 1, wherein the contextual information is captured by the endpoint device responsive to detection of a suspicious or malicious event detected by the endpoint device that relates to a process running on the endpoint device that is associated with the file.

5. The method of claim 4, wherein the contextual information includes:
   command line information associated with the process;
   an execution chain associated with the process;
   a memory dump associated with the process;
   information indicative of an application with which the process is associated;
   information identifying an end user associated with the process; or
   environment variables associated with the process.

6. The method of claim 1, wherein the sandbox service is a cloud-based security service.

7. The method of claim 1, wherein the second series of actions are based on reverse actions of the first series of actions.

8. The method of claim 1, wherein each action of the first series of action is associated with an undo recipe that is used to generate the remediation script specifying the second series of actions.

9. The method of claim 1, wherein the first series of actions include one or more of:
   a change in a registry file of the endpoint device;
   a change in a system file of the endpoint device;
   addition of a new user account on the endpoint device;
   addition of a new firewall rule; and
   a change to an existing firewall rule.

10. The method of claim 1, wherein the sandbox service captures the information regarding the first series of actions by tracing operating system code of the endpoint device.

11. The method of claim 1, wherein a three-dimensional in-memory graph represents the first series of actions in an operating system of the endpoint device.

12. The method of claim 1, wherein the sandbox service captures the information regarding the first series of actions based on at least one of static analysis or dynamic analysis of the file.

13. A non-transitory computer-readable storage medium embodying a set of instructions, which when executed by one or more processing resources associated with a sandbox service, causes the one or more processing resources to perform a method comprising:
   receiving a file containing malware via a communication network from an endpoint device and contextual information associated with the file, wherein the endpoint device has been infected by the malware;
   capturing information regarding a first series of actions performed by the malware, wherein the capturing is done based at least in part upon receiving the file and the contextual information;
   generating a remediation script specifying a second series of actions that are configured to restore the endpoint device to a pre-infected state representing a state of the endpoint device prior to being infected by the malware, wherein the generating is based at least in part on the first series of actions;
   transferring the remediation script to an endpoint agent executing on the endpoint device via the communication network; and causing the endpoint device to execute the remediation script.

14. The non-transitory computer-readable storage medium of claim 13, wherein the contextual information is captured by the endpoint security solution responsive to detection of a suspicious or malicious event detected by the endpoint security solution that relates to a process running on the endpoint device that is associated with the file.

15. The non-transitory computer-readable storage medium of claim 13, wherein the contextual information includes:
   command line information associated with the process;
   an execution chain associated with the process;
   a memory dump associated with the process;
   information indicative of an application with which the process is associated;
   information identifying an end user associated with the process; or
   environment variables associated with the process.

16. The non-transitory computer-readable storage medium of claim 13, wherein the sandbox service is in a form of a virtual sandbox appliance.

17. The non-transitory computer-readable storage medium of claim 13, wherein the second series of actions are based on reverse actions of the first series of actions.

18. The non-transitory computer-readable storage medium of claim 13, wherein each action of the first series of action is associated with an undo recipe that is used to generate the remediation script specifying the second series of actions.

19. The non-transitory computer-readable storage medium of claim 13, wherein the first series of actions include one or more of:

a change in a registry file of the endpoint device;
a change in a system file of the endpoint device;
addition of a new user account on the endpoint device;
addition of a new firewall rule; and
a change to an existing firewall rule.

20. The non-transitory computer-readable storage medium of claim 13, wherein the sandbox service captures the information regarding the first series of actions based on at least one of static analysis or dynamic analysis of the file.

21. The non-transitory computer readable medium of claim 13, wherein executing the remediation script returns the endpoint device to the pre-infected state.

22. The non-transitory computer readable medium of claim 13, wherein each action of the first series of actions is associated with a time stamp.

23. A system for malware recovery, the system comprising:
   a processing resource associated with a sandbox service; and
   a non-transitory computer medium embodying accessible by the processing resource, wherein the non-transitory computer readable medium includes a set of instructions, which when executed by one or more processing resources associated with a sandbox service, causes the one or more processing resources to perform a method comprising:
   receiving a file containing malware via a communication network from an endpoint device and contextual information associated with the file, wherein the endpoint device has been infected by the malware;
   capturing information regarding a first series of actions performed by the malware, wherein the capturing is done based at least in part upon receiving the file and the contextual information;
   generating a remediation script specifying a second series of actions that are configured to restore the endpoint device to a pre-infected state representing a state of the endpoint device prior to being infected by the malware, wherein the generating is based at least in part on the first series of actions;
   transferring the remediation script to an endpoint agent executing on the endpoint device via the communication network; and causing the endpoint device to execute the remediation script.

24. The system of claim 23, wherein executing the remediation script returns the endpoint device to the pre-infected state.

25. The system of claim 23, wherein each action of the first series of actions is associated with a time stamp.

* * * * *